(12) United States Patent
Liu et al.

(10) Patent No.: US 11,689,271 B2
(45) Date of Patent: Jun. 27, 2023

(54) METHODS AND DEVICES FOR BEAM FAILURE RECOVERY

(71) Applicant: Telefonaktiebolaget LM Ericsson (publ), Stockholm (SE)

(72) Inventors: Jinhua Liu, Beijing (CN); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 37 days.

(21) Appl. No.: 16/968,699

(22) PCT Filed: Feb. 11, 2019

(86) PCT No.: PCT/CN2019/074789
§ 371 (c)(1),
(2) Date: Aug. 10, 2020

(87) PCT Pub. No.: WO2019/154418
PCT Pub. Date: Aug. 15, 2019

(65) Prior Publication Data
US 2021/0021321 A1    Jan. 21, 2021

(30) Foreign Application Priority Data
Feb. 11, 2018   (WO) ................ PCT/CN2018/076316

(51) Int. Cl.
*H04B 7/06* (2006.01)
*H04W 76/18* (2018.01)
(Continued)

(52) U.S. Cl.
CPC ........... *H04B 7/0695* (2013.01); *H04B 7/088* (2013.01); *H04W 72/21* (2023.01); *H04W 76/18* (2018.02);
(Continued)

(58) Field of Classification Search
CPC . H04B 7/0695; H04B 7/088; H04W 72/0413; H04W 76/18; H04W 74/04;
(Continued)

(56) References Cited

U.S. PATENT DOCUMENTS

2019/0053288 A1* 2/2019 Zhou .................. H04W 74/006
2019/0074882 A1* 3/2019 Zhou .................. H04L 5/0098
(Continued)

OTHER PUBLICATIONS

International Search Report and Written Opinion issued in International Application No. PCT/CN2019/074789 dated Apr. 28, 2019 (10 pages).
(Continued)

*Primary Examiner* — Kenneth T Lam
(74) *Attorney, Agent, or Firm* — Rothwell, Figg, Ernst & Manbeck, P.C.

(57) ABSTRACT

The present disclosure provides a method (100) in a network device for configuration of Beam Failure Recovery, BFR. The method (100) includes: receiving (110) from a terminal device a beam failure report associated with a Secondary Cell, SCell. The method (100) further includes: configuring (120) the terminal device with at least one of the following BFR options: BFR with Physical Uplink Control Channel, PUCCH, BFR with Contention Free Random Access, CFRA, BFR with Contention Based Random Access, CBRA, and BFR without Physical Random Access Channel, PRACH, and PUCCH.

20 Claims, 7 Drawing Sheets

(51) Int. Cl.
- *H04B 7/08* (2006.01)
- *H04W 72/21* (2023.01)
- *H04W 74/04* (2009.01)
- *H04W 74/08* (2009.01)

(52) U.S. Cl.
CPC .......... *H04W 74/04* (2013.01); *H04W 74/085* (2013.01); *H04W 74/0816* (2013.01)

(58) Field of Classification Search
CPC ........... H04W 74/0816; H04W 74/085; H04W 72/21
See application file for complete search history.

(56) References Cited

U.S. PATENT DOCUMENTS

| | | | |
|---|---|---|---|
| 2019/0190582 A1* | 6/2019 | Guo | H04W 72/046 |
| 2019/0200248 A1* | 6/2019 | Basu Mallick | H04B 7/0695 |
| 2019/0215048 A1* | 7/2019 | Cirik | H04B 7/088 |
| 2020/0178338 A1* | 6/2020 | Ahn | H04B 7/0626 |
| 2020/0228185 A1* | 7/2020 | Tao | H04W 72/042 |
| 2020/0275524 A1* | 8/2020 | Wang | H04W 74/0833 |
| 2020/0322031 A1* | 10/2020 | You | H04L 5/001 |
| 2020/0322035 A1* | 10/2020 | Shi | H04L 5/0048 |
| 2020/0322813 A1* | 10/2020 | Jia | H04W 16/28 |
| 2020/0373992 A1* | 11/2020 | Wang | H04L 5/0051 |
| 2020/0374960 A1* | 11/2020 | Deenoo | H04W 72/1284 |
| 2021/0126753 A1* | 4/2021 | Mochizuki | H04L 5/0037 |

OTHER PUBLICATIONS

Huawei et al., "Beam failure recovery for SCell", 3GPP TSG RAN WG1 Meeting #94bis, R1-1810106, Chengdu, China Oct. 12, 2018, (6 pages).

Huawei et al., "Remaining issue for beam failure recovery", 3GPP TSG-RAN WG2 Ad Hoc, R2-1800632, Vancouver, Canada, Jan. 26, 2018 (4 pages).

Ericsson, "SCell RLF discussion" 3GPP TSG-RAN WG2 #100, R2-1713395, Reno, Nevada Dec. 1, 2017 (5 pages).

Huawei et al., "RAN2 aspects of DL beam management", 3GPP TSG-RAN WGS#99bis, R2-1710562, Prague, Czech Republic, Oct. 9-13, 2017 (4 pages).

Lenovo et al., "Dedicated resource configuration for beam failure recovery", 3GPP TSG-RAN WG2 Meeting#100, R2-1712959 Revision of R2-1711370, Reno, USA, Nov. 27-Dec. 1, 2017 (4 pages).

Catt, "Summary on BFR detection and other BFR issues", 3GPP TSG-RAN WG2 NR Ad hoc 0118, R2-1801558, Vancouver, Canada, Jan. 2018 (11 pages).

Ran2, "LS on encrypting broadcasted positioning data", 3GPP TSG-RAN WG2 Meeting #99Bis, R2-1712031, Prague, Czech Republic, Oct. 2017 (1 page).

Session Chair (InterDigital), "Report from LTE and NR User Plane Break-Out Session", 3GPP TSG-RAN WG2 Meeting #100, R2-1714117, Reno, USA, Dec. 2017 (58 pages).

MCC Support, "Final Report of 3GPP TSG RAN WG1 #89 v1.0.0 (Hangzhou, China, May 2017)", 3GPP TSG RAN WG1 Meeting #90, R1-1712031, Prague, Czech Republic, Aug. 2017 (165 pages).

* cited by examiner

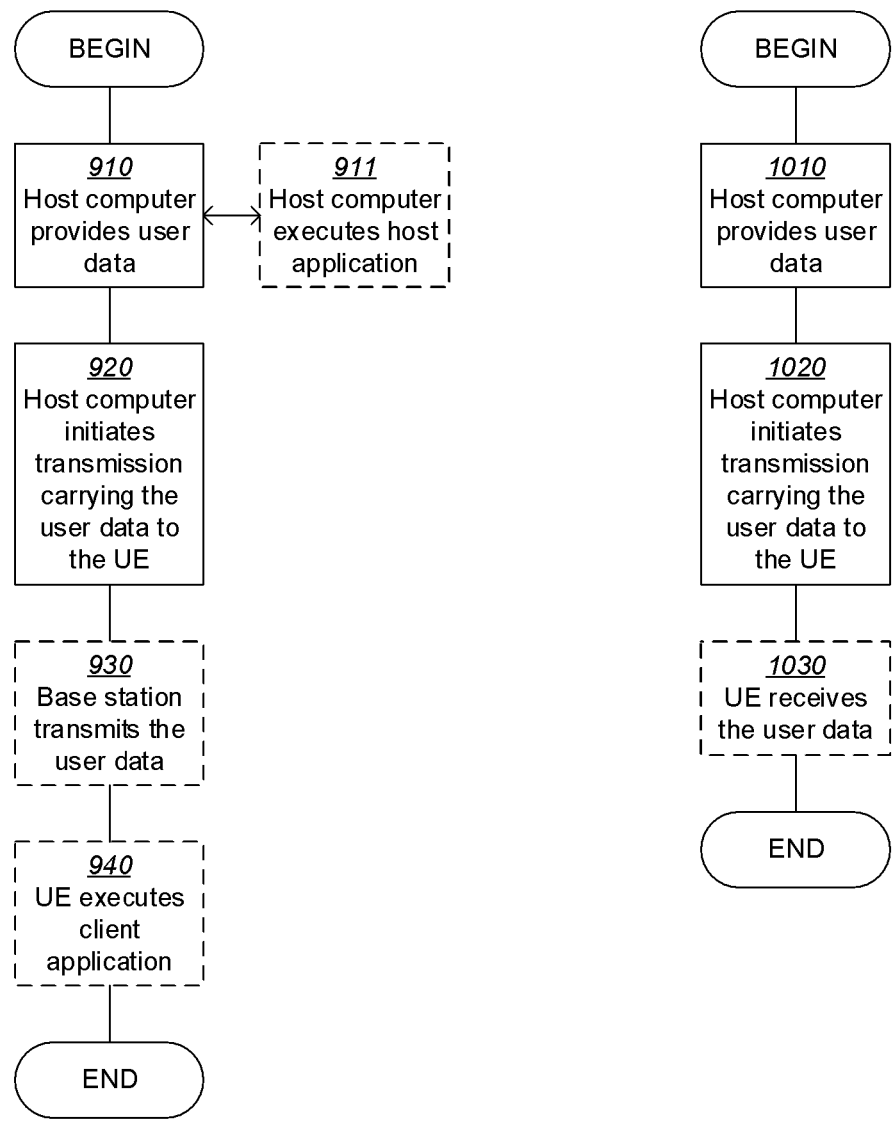

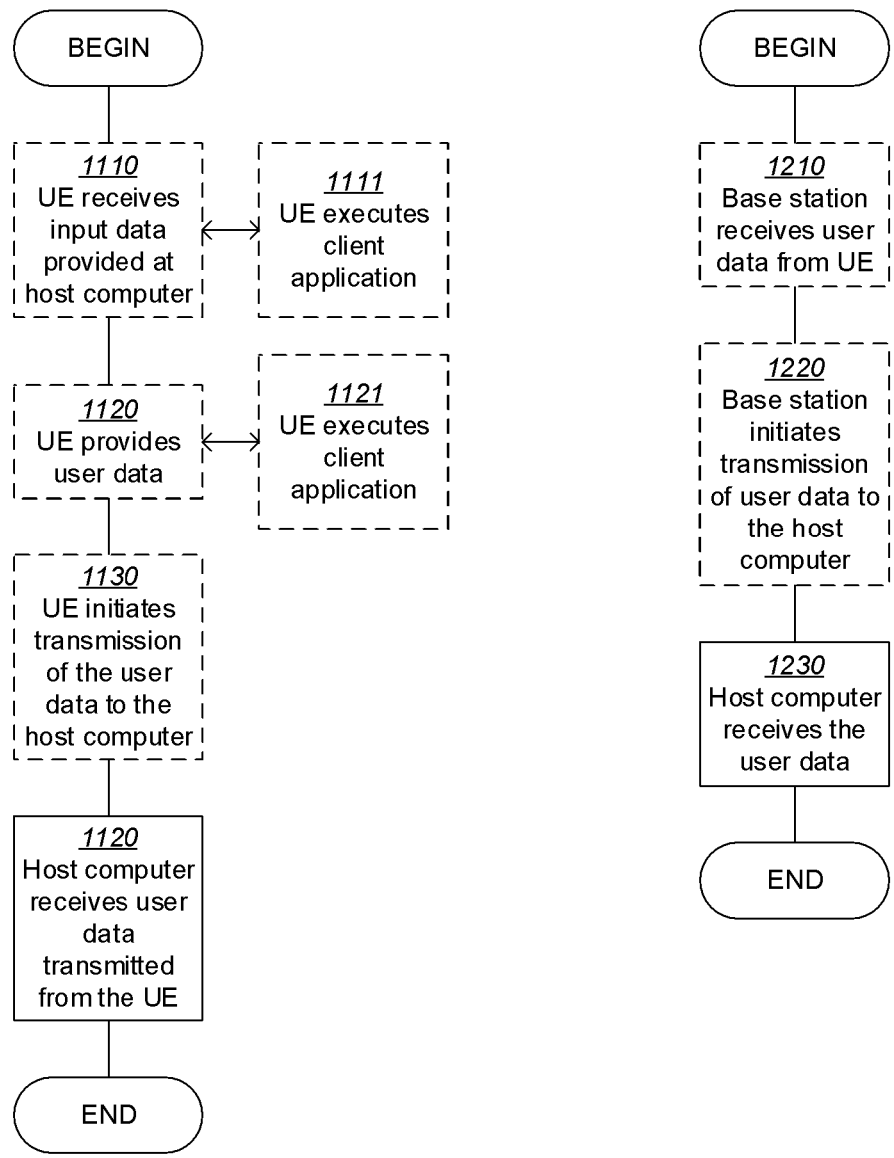

METHODS AND DEVICES FOR BEAM FAILURE RECOVERY

CROSS REFERENCE TO RELATED APPLICATION(S)

This application is a 35 U.S.C. § 371 National Stage of International Patent Application No. PCT/CN2019/074789, filed Feb. 11, 2019, designating the United States, which claims priority to PCT/CN2018/076316, filed Feb. 11, 2018. The above identified applications are incorporated by this reference.

TECHNICAL FIELD

The present disclosure relates to wireless communications, and more particularly, to methods and devices for Beam Failure Recovery (BFR).

BACKGROUND

In New Radio (NR), beam based radio link maintenance is adopted. There are both radio link maintenance and beam link maintenance in the NR.

The radio link maintenance can be achieved based on a radio link monitoring procedure. A Radio Link Failure (RLF) can be detected at a terminal device based on a number of measurements such as hypothetical Physical Downlink Control Channel (PDCCH) Block Error Rate (BLER), Radio Link Control (RLC) retransmissions in RLC acknowledgement mode and a failure of random access to a target cell during handover. An RLF can also be detected at a network device (e.g., a gNB) based on e.g. a poor uplink radio channel quality.

When an RLF is detected, a terminal device will release configured radio resources such as Physical Uplink Control Channel (PUCCH), configured semi-static uplink grants or downlink assignments, Channel State Information-Reference Signals (CSI-RSs), Sounding Reference Signals (SRSs), Demodulation Reference Signals (DMRS), etc., skip dynamic grants from its serving cell, and start a radio connection re-establishment procedure. In the radio connection re-establishment procedure, the terminal device first selects a target cell and then performs a random access to the cell. A Cell-Radio Network Temporary Identifier (C-RNTI) can be reported in Message 3 via a Medium Access Control (MAC) Control Element (CE) so that the target cell can identify the terminal device and retrieve the UE context. Once the random access has succeeded, radio resources can be reconfigured for the terminal device.

For the beam link maintenance, a terminal device can monitor a beam link quality based on hypothetical PDCCH BLER as well. For example, a beam failure can be detected when a beam link quality is worse than a preconfigured threshold for a number of times. Unlike the above scenario of RLF, when a beam failure is detected, the terminal device will not release configured resources (such as PUCCH resources, CSI-RSs, SRSs, DMRSs, PDCCH resources and configured uplink grants and/or downlink assignments). In this case, the terminal device can perform a Beam Failure Recovery (BFR) procedure, including BFR with PUCCH, BFR with Contention Based Random Access (CBRA) or BFR with Contention Free Random Access (CFRA). For details of the BFR with PUCCH and the BFR with CFRA, reference can be made to *Final Report of 3GPP TSG RAN WG1 #89*, v1.0.0, *3GPP TSG RAN WG1 Meeting #90, R1-1712031, Prague, Czech Rep, 21-25 Aug.* 2017; and for details of the BFR with CBRA, reference can be made to *Report from LTE and NR User Plane Break-Out Session, 3GPP TSG-RAN WG2 Meeting #100, R2-1714117, Reno, USA, 27 Nov.-1 Dec.* 2017, both incorporated herein by reference.

Moreover, a Carrier Aggregation feature will be supported in the NR. A terminal device can be configured with e.g., up to 16 carriers, including one Primary Cell (PCell) and one or more Secondary Cells (SCells). When a beam failure occurs in an SCell, the terminal device may not be able to transmit or receive data in that SCell.

It is thus desired to perform BFR for SCells.

SUMMARY

It is an object of the present disclosure to provide methods and devices for BFR for an SCell.

According to a first aspect of the present disclosure, a method in a network device for configuration of Beam Failure Recovery (BFR) is provided. The method includes: receiving from a terminal device a beam failure report associated with a Secondary Cell (SCell). The method further includes: configuring the terminal device with at least one of the following BFR options: BFR with Physical Uplink Control Channel (PUCCH), BFR with Contention Free Random Access (CFRA), BFR with Contention Based Random Access (CBRA), and BFR without Physical Random Access Channel (PRACH) and PUCCH.

In an embodiment, the method may further include: transmitting to the terminal device an acknowledgement of receipt of the beam failure report.

In an embodiment, the at least one BFR option may be configured in the acknowledgement.

In an embodiment, the acknowledgement may indicate one or more of: an index or Cell/Carrier Indicator Flag (CIF) of the SCell, an index of a candidate beam recommended for BFR, an indicator of one of the BFR options; a PUCCH resource when the BFR with PUCCH is configured, or a PRACH resource when the BFR with CFRA is configured, and an index of a serving cell in which the terminal device is to perform the BFR, and/or when a Supplementary Uplink (SUL) carrier is configured for that serving cell, an indication of whether the SUL carrier is to be used for the BFR.

In an embodiment, the method may further include: configuring the terminal device with a PUCCH resource pool via Radio Resource Control (RRC) signaling. The acknowledgement indicating a PUCCH resource includes: the acknowledgement indicating a PUCCH resource in the PUCCH resource pool.

In an embodiment, the acknowledgement may be transmitted in a Medium Access Control (MAC) Control Element (CE).

In an embodiment, the acknowledgement may be transmitted in one single MAC CE along with another acknowledgement of receipt of another beam failure report associated with another SCell.

In an embodiment, the acknowledgement may be transmitted via RRC signaling.

In an embodiment, the acknowledgement may be transmitted as a MAC CE that is identified by a MAC Protocol Data Unit (PDU) sub-header with a predefined Logic Channel Identifier (LCID) and has a null payload.

In an embodiment, the at least one BFR option may be configured via RRC signaling.

In an embodiment, the acknowledgement may be transmitted in a Primary Cell (PCell), a PUCCH SCell, or an SCell with a configured downlink.

In an embodiment, the method may further include configuring the terminal device with a BFR priority for each serving cell based on at least one of: a carrier frequency of that serving cell, a numerology or transmission duration of that serving cell, a service or logical channel associated with or mapped to that serving cell, a traffic load in that serving cell and whether the serving cell is a PUCCH SCell.

According to a second aspect of the present disclosure, a network device is provided. The network device includes a transceiver, a processor and a memory. The memory includes instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the network device to perform the method according to the above first aspect.

According to a fourth aspect of the present disclosure, a method in a terminal device for Beam Failure Recovery (BFR) is provided. The method includes: detecting a beam failure associated with a Secondary Cell (SCell); and transmitting to a network device a beam failure report associated with the beam failure. The method further includes: receiving a configuration of at least one of the following BFR options: BFR with Physical Uplink Control Channel (PUCCH), BFR with Contention Free Random Access (CFRA), BFR with Contention Based Random Access (CBRA), and BFR without Physical Random Access Channel (PRACH) and PUCCH; and performing a BFR in accordance with the at least one BFR option.

In an embodiment, the method may further include: receiving from the network device an acknowledgement of receipt of the beam failure report.

In an embodiment, the configuration of the at least one BFR option may be received in the acknowledgement.

In an embodiment, the acknowledgement may indicate one or more of: an index or Cell/Carrier Indicator Flag (CIF) of the SCell, an index of a candidate beam recommended for BFR, an indicator of one of the BFR options; a PUCCH resource when the BFR with PUCCH is configured, or a PRACH resource when the BFR with CFRA is configured, and an index of a serving cell in which the terminal device is to perform the BFR, and/or when a Supplementary Uplink (SUL) carrier is configured for that serving cell, an indication of whether the SUL carrier is to be used for the BFR.

In an embodiment, the method may further include: receiving from the network device a configuration of a PUCCH resource pool via Radio Resource Control (RRC) signaling. The acknowledgement indicating a PUCCH resource includes: the acknowledgement indicating a PUCCH resource in the PUCCH resource pool.

In an embodiment, the acknowledgement may be received in a Medium Access Control, (MAC) Control Element (CE).

In an embodiment, the acknowledgement may be received in one single MAC CE along with another acknowledgement of receipt of another beam failure report associated with another SCell.

In an embodiment, the acknowledgement may be received via RRC signaling.

In an embodiment, the acknowledgement may be received as a MAC CE that is identified by a MAC Protocol Data Unit (PDU) sub-header with a predefined Logic Channel Identifier (LCID) and has a null payload.

In an embodiment, the configuration of the at least one BFR option may be received via RRC signaling.

In an embodiment, the acknowledgement may be received in a Primary Cell (PCell), a PUCCH SCell, or an SCell with a configured downlink.

In an embodiment, when the BFR is performed in accordance with the BFR without PRACH and PUCCH, the BFR may be performed in the SCell and the method may further include: determining whether the BFR has succeeded based on a downlink or uplink data transmission in the SCell.

In an embodiment, the operation of determining whether the BFR has succeeded based on a downlink data transmission in the SCell may include: receiving a downlink data over a Physical Downlink Shared Channel (PDSCH); transmitting a Hybrid Automatic Repeat reQuest (HARQ) Acknowledgement (ACK) or Non-Acknowledgement (NACK) over PUCCH in response to the downlink data; and determining, when an ACK is transmitted, that the BFR has succeeded when no further Physical Downlink Control Channel (PDCCH) is received for scheduling retransmission of the downlink data, or determining, when a NACK is transmitted, that the BFR has succeeded when Downlink Control Information (DCI) is received for scheduling retransmission of the downlink data with a redundancy version value different from an initial value or without New Data Indication (NDI) toggling.

In an embodiment, the operation of determining whether the BFR has succeeded based on an uplink data transmission in the SCell may include: transmitting an uplink data over a Physical Uplink Shared Channel (PUSCH); and determining that the BFR has succeeded when no Downlink Control Information (DCI) is received for scheduling retransmission of the uplink data within a predetermined time period, or DCI is received for scheduling retransmission of the uplink data with a redundancy version value different from an initial value or without New Data Indication (NDI) toggling.

In an embodiment, the method may further include: receiving from the network device a configuration of a BFR priority for each serving cell dependent on at least one of: a carrier frequency of that serving cell, a numerology or transmission duration of that serving cell, a service or logical channel associated with or mapped to that serving cell, a traffic load in that serving cell and whether the serving cell is a PUCCH SCell.

In an embodiment, the method may further include: prior to transmitting the beam failure report: transmitting to the network device a PUCCH Scheduling Request (SR) for requesting an uplink grant for transmission of the beam failure report.

In an embodiment, the method may further include: starting a timer associated with the acknowledgement when the beam failure report is transmitted; and retransmitting the beam failure report upon expiry of the timer.

According to a fifth aspect of the present disclosure, a terminal device is provided. The terminal device includes a transceiver, a processor and a memory. The memory includes instructions executable by the processor whereby the terminal device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a terminal device, cause the terminal device to perform the method according to the above fourth aspect.

With the above embodiments, a network device can configure a terminal device with one or more BFR options, including BFR with PUCCH, BFR with CFRA, BFR with CBRA, and BFR without PRACH and PUCCH. Accordingly, when the terminal device detects a beam failure in an SCell, it can perform BFR in accordance with the configured BFR option. With configurable BFR options, it is possible to reduce PRACH load in a PCell.

BRIEF DESCRIPTION OF THE DRAWINGS

The above and other objects, features and advantages will be more apparent from the following description of embodiments with reference to the figures, in which:

FIGS. 9 to 12 are flowcharts illustrating methods implemented in a communication system including a host computer, a base station and a user equipment.

DETAILED DESCRIPTION

Figure 1:
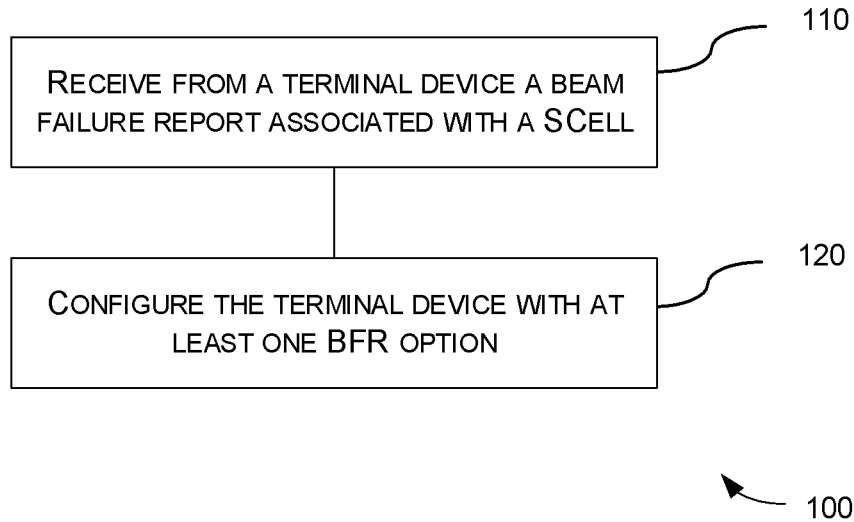
FIG. 1 is a flowchart illustrating a method in a network device for control of BWP switching according to an embodiment of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In *Summary on BFR detection and other BFR issues, 3GPP TSG-RAN WG2 NR Ad hoc 0118, R2-1801558, Vancouver, Canada, 22 Jan.-26 Jan.* 2018, it has been proposed to initiate a BFR procedure in a PCell to support BFR in an SCell.

When a terminal device detects a beam failure in an SCell, it can transmit a beam failure report to a network device via a MAC CE over PUSCH in a PCell. The report may indicate one or more candidate beams for BFR. Upon receipt of the beam failure report, the network device can instruct the terminal device to perform PRACH-based procedure using a candidate beam. This may require allocating dedicated PRACH resources in the PCell for candidate beams for the purpose of BFR, which may result in PRACH overload in the PCell.

FIG. 1 is a flowchart illustrating a method 100 for configuration of BFR according to an embodiment of the present disclosure. The method 100 can be performed at a network device.

At block 110, the network device receives from a terminal device a beam failure report associated with an SCell. The beam failure report can be received in a PCell.

At block 120, the network device configures the terminal device with at least one of the following BFR options: BFR with PUCCH, BFR with CFRA, BFR with CBRA, and BFR without PRACH and PUCCH.

In an example, the network device can transmit to the terminal device an acknowledgement of receipt of the beam failure report. The acknowledgement can be transmitted in the PCell, a PUCCH SCell, or an SCell with a configured downlink.

In this case, in the block 110, the at least one BFR option can be configured in the acknowledgement.

Further, the acknowledgement may indicate an index or Cell/Carrier Indicator Flag (CIF) of the SCell where a beam failure occurs as indicated in the beam failure report. Additionally or alternatively, the acknowledgement may indicate an index of a candidate beam recommended for BFR. The recommended candidate beam may be selected from a set of candidate beams indicated in the beam failure report based on e.g., their beam radio qualities. For example, the recommended candidate beam can have a Synchronization Signal-Reference Signal Received Power (SS-RSRP) higher than a predetermined threshold. The network device may not always select the candidate beam having the highest radio quality for load balancing. Additionally or alternatively, the acknowledgement may indicate an indicator of one of the BFR options. Additionally or alternatively, the acknowledgement may indicate a PUCCH resource when the BFR with PUCCH is configured, or a PRACH resource when the BFR with CFRA is configured, for use by the terminal device in the BFR. This allows saving PUCCH/PRACH resources when compared with always reserving PUCCH/PRACH resources for BFR. Additionally or alternatively, the acknowledgement may indicate an index of a serving cell in which the terminal device is to perform the BFR. For the BFR with PUCCH, BFR with CFRA and BFR with CBRA, the serving cell here can be the PCell, the SCell where the beam failure occurs as indicated in the beam failure report, or any other SCell. For the BFR without PRACH and PUCCH, the serving cell here will be the SCell where the beam failure occurs. Optionally, when a Supplementary Uplink (SUL) carrier is configured for that serving cell, the acknowledgement may further indicate whether the SUL carrier is to be used for the BFR.

In an example where the BFR with PUCCH is configured, the network device can configure the terminal device with a PUCCH resource pool via Radio Resource Control (RRC) signaling. Upon receipt of the beam failure report, the network device can indicate in the acknowledgement a PUCCH resource in the PUCCH resource pool.

In an example, the acknowledgement can be transmitted in a MAC CE. In this case, a new MAC CE can be defined, which contains new fields for carrying the above described information to be indicated by the acknowledgement. Furthermore, the acknowledgement can be transmitted in one single MAC CE along with another acknowledgement of receipt of another beam failure report associated with another SCell. For example, when there is more than one beam failure reported by the terminal device, the network device can aggregate more than one acknowledgement into one single MAC CE. In this case, a bitmap field can be included in the MAC CE for indicating the serving cell or candidate beam for use by the terminal device in the BFR.

In another example, the acknowledgement can be transmitted via RRC signaling, instead of MAC CE. An RRC message can be defined to carry the above-described information to be indicated by the acknowledgement.

Alternatively, in the block 120, the at least one BFR option can be configured via RRC signaling. For example, the block 120 may occur before the block 110 and the network device can preconfigure the terminal device with one or more BFR options via RRC signaling. In this case, optionally, when receiving the beam failure report, the network device can transmit to the terminal device an acknowledgement of receipt of the beam failure report. The acknowledgement may include an index or CIF of the SCell; an index of a candidate beam recommended for BFR; an indicator of one of the BFR options; a PUCCH resource when the BFR with PUCCH is configured, or a PRACH resource when the BFR with CFRA is configured; and an index of a serving cell in which the terminal device is to perform the BFR, and/or when a SUL carrier is configured for that serving cell, an indication of whether the SUL carrier is to be used for the BFR, as described above. Alternatively, the acknowledgement can be transmitted as a special MAC CE that is identified by a MAC Protocol Data Unit (PDU) sub-header with a predefined Logic Channel Identifier (LCID) and has a null payload. Upon receipt of such special MAC CE, the terminal device can perform a BFR in accordance with the preconfigured BFR option (when more than one BFR option is configured, the terminal device can select one of the BFR options as appropriate). As another alternative, the network device does not transmit any acknowledgement to the terminal device. In this case, the terminal device can also perform a BFR in accordance with the preconfigured BFR option (when more than one BFR option is configured, the terminal device can select one of the BFR options as appropriate). In an example, when no acknowledgement is available, the terminal device can perform a BFR without PRACH and PUCCH.

In an example, the network device can configure the terminal device with a BFR priority for each serving cell (particularly each SCell), e.g., via RRC signaling. When beam failures occur in more than one serving cell, a serving cell having a higher BFR priority will have its beam failure reported earlier and its associated BFR triggered earlier. The BFR priority of a serving cell can be configured based on at least one of: a carrier frequency of that serving cell (e.g., a serving cell having a higher carrier frequency may have a higher BFR priority), a numerology or transmission duration of that serving cell (e.g., a serving cell having a larger Sub-Carrier Spacing (SCS) and/or smaller transmission duration may have a higher BFR priority), a service or logical channel associated with or mapped to that serving cell (e.g., a serving cell having a service or logical channel associated with higher Quality of Service (QoS) may have a higher BFR priority), a traffic load in that serving cell (e.g., a serving cell having a higher traffic load may have a higher BFR priority) and whether the serving cell is a PUCCH SCell (e.g., a PUCCH SCell may have a higher BFR priority than a non-PUCCH SCell).

Figure 2:
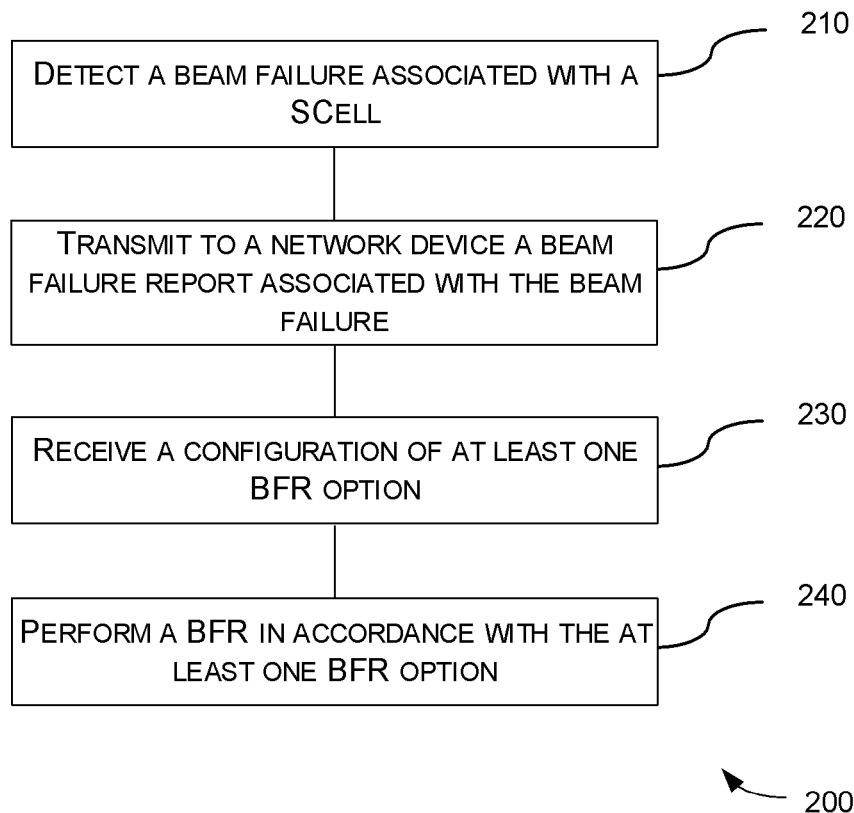
FIG. 2 is a flowchart illustrating a method in a terminal device for control of BWP switching according to an embodiment of the present disclosure.

FIG. 2 is a flowchart illustrating a method 200 for BFR according to an embodiment of the present disclosure. The method 200 can be performed at a terminal device.

At block 210, the terminal device detects a beam failure associated with an SCell.

At block 220, the network device transmits to a network device a beam failure report associated with the beam failure. The beam failure report can be transmitted in a PCell.

At block 230, the terminal device receives a configuration of at least one of the following BFR options: BFR with PUCCH, BFR with CFRA, BFR with CBRA, and BFR without PRACH and PUCCH.

At block 240, the terminal device performs a BFR in accordance with the at least one BFR option. Here, when more than one BFR option is configured, the terminal device can select one of the configured BFR options as appropriate for performing the BFR.

In an example, after transmitting the beam failure report to the network device, the terminal device can receive from the network device an acknowledgement of receipt of the beam failure report. The acknowledgement can be received in the PCell, a PUCCH SCell, or an SCell with a configured downlink.

In this case, in the block 230, the configuration of the at least one BFR option can be received in the acknowledgement.

Further, as described above in connection with the method 100, the acknowledgement can indicate one or more of: an index or CIF of the SCell; an index of a candidate beam recommended for BFR; an indicator of one of the BFR options; a PUCCH resource when the BFR with PUCCH is configured, or a PRACH resource when the BFR with CFRA is configured; and an index of a serving cell in which the terminal device is to perform the BFR, and/or when a SUL carrier is configured for that serving cell, an indication of whether the SUL carrier is to be used for the BFR.

In an example where the BFR with PUCCH is configured, the terminal device can receive from the network device a configuration of a PUCCH resource pool via RRC signaling. In this case, the acknowledgement can indicate a PUCCH resource in the PUCCH resource pool.

In an example, the acknowledgement can be received in a MAC CE. As described above in connection with the method 100, a new MAC CE can be defined, which contains new fields for carrying the above described information to be indicated by the acknowledgement. Furthermore, the acknowledgement can be received in one single MAC CE along with another acknowledgement of receipt of another beam failure report associated with another SCell. In this case, a bitmap field can be included in the MAC CE for indicating the serving cell or candidate beam for use by the terminal device in the BFR.

In another example, the acknowledgement can be received via RRC signaling, instead of MAC CE. An RRC message can be defined to carry the above-described information to be indicated by the acknowledgement.

Alternatively, in the block 230, the configuration of the at least one BFR option can be received via RRC signaling. For example, the block 230 may occur before the block 210 and the terminal device can be preconfigured with one or more BFR options via RRC signaling. In this case, optionally, the terminal device can receive from the network device an acknowledgement of receipt of the beam failure report. The acknowledgement may include an index or CIF of the SCell; an index of a candidate beam recommended for BFR; an indicator of one of the BFR options; a PUCCH resource when the BFR with PUCCH is configured, or a PRACH resource when the BFR with CFRA is configured; and an index of a serving cell in which the terminal device is to perform the BFR, and/or when a SUL carrier is configured for that serving cell, an indication of whether the SUL carrier is to be used for the BFR, as described above. Alternatively, the acknowledgement can be received as a special MAC CE that is identified by a MAC PDU sub-header with a predefined LCID and has a null payload. Upon receipt of such special MAC CE, the terminal device can perform a BFR in accordance with the preconfigured BFR option (when more than one BFR option is configured, the terminal device can select one of the BFR options as appropriate). As another alternative, no acknowledgement is received by the terminal device. In this case, the terminal device can also perform a BFR in accordance with the preconfigured BFR option (when more than one BFR option is configured, the terminal device can select one of the BFR options as appropriate). In an example, when no acknowledgement is available, the terminal device can perform a BFR without PRACH and PUCCH.

In an example, when the BFR is performed in accordance with the BFR without PRACH and PUCCH, in the block 240, the BFR can be performed in the SCell. In this case, the terminal device can determine whether the BFR has succeeded based on a downlink data transmission in the SCell. In particular, the terminal device can receive a downlink data over a Physical Downlink Shared Channel (PDSCH) and then transmit a Hybrid Automatic Repeat reQuest (HARQ) Acknowledgement (ACK) or Non-Acknowledgement (NACK) over PUCCH in response to the downlink data. When an ACK is transmitted, the terminal device can determine that the BFR has succeeded when no further Physical Downlink Control Channel (PDCCH) is received for scheduling retransmission of the downlink data. On the other hand, when a NACK is transmitted, the terminal device can determine that the BFR has succeeded when Downlink Control Information (DCI) is received for scheduling retransmission of the downlink data with a redundancy version value different from an initial value or without New Data Indication (NDI) toggling.

Alternatively, the terminal device can determine whether the BFR has succeeded based on an uplink data transmission in the SCell. In particular, the terminal device can transmit an uplink data over a Physical Uplink Shared Channel (PUSCH). Then, the terminal device can determine that the BFR has succeeded when no DCI is received for scheduling retransmission of the uplink data within a predetermined time period, or when DCI is received for scheduling retransmission of the uplink data with a redundancy version value different from an initial value or without NDI toggling.

In an example, the terminal device can receive from the network device a configuration of a BFR priority for each serving cell (particularly each SCell), e.g., via RRC signaling. When beam failures occur in more than one serving cell, a serving cell having a higher BFR priority will have its beam failure reported earlier and its associated BFR triggered earlier. The BFR priority of a serving cell can be dependent on at least one of: a carrier frequency of that serving cell (e.g., a serving cell having a higher carrier frequency may have a higher BFR priority), a numerology or transmission duration of that serving cell (e.g., a serving cell having a larger Sub-Carrier Spacing (SCS) and/or smaller transmission duration may have a higher BFR priority), a service or logical channel associated with or mapped to that serving cell (e.g., a serving cell having a service or logical channel associated with higher Quality of Service (QoS) may have a higher BFR priority), a traffic load in that serving cell (e.g., a serving cell having a higher traffic load may have a higher BFR priority) and whether the serving cell is a PUCCH SCell (e.g., a PUCCH SCell may have a higher BFR priority than a non-PUCCH SCell).

In an example, when the beam failure is detected in the block 210 and there is no uplink grant available for the beam failure report, the terminal device can transmit to the network device a PUCCH Scheduling Request (SR) for requesting an uplink grant for transmission of the beam failure report. Conventionally, a PUCCH SR can only be triggered for a Buffer Status Report (BSR) indicating new data arrival at the terminal device. A new rule can be defined such that a PUCCH SR can be triggered when the terminal device has a beam failure report for transmission.

In an example, when the beam failure report is transmitted in the block 220, a timer associated with an acknowledgement (referred to as retxBFReport-Timer) can be started. If an acknowledgement is received before expiry of the timer, the timer will be reset; otherwise the terminal device can retransmit the beam failure report upon expiry of the timer.

Figure 3:
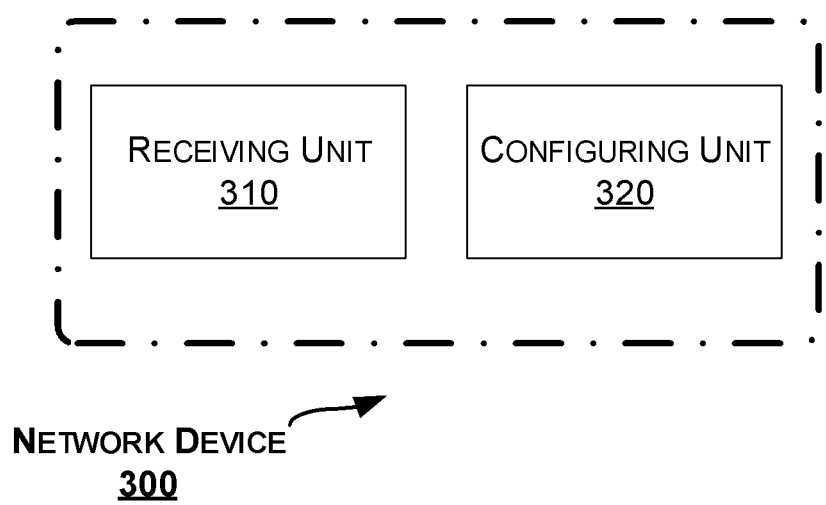
FIG. 3 is a block diagram of a network device according to an embodiment of the present disclosure.

Correspondingly to the method 100 as described above, a network device is provided. FIG. 3 is a block diagram of a network device 300 according to an embodiment of the present disclosure.

As shown in FIG. 3, the network device 300 includes a receiving unit 310 configured to receive from a terminal device a beam failure report associated with an SCell. The network device 300 further includes a configuring unit 320 configured to configure the terminal device with at least one of the following BFR options: BFR with Physical Uplink Control Channel (PUCCH), BFR with Contention Free Random Access (CFRA), BFR with Contention Based Random Access (CBRA), and BFR without Physical Random Access Channel (PRACH) and PUCCH.

In an embodiment, the network device 300 can further include a transmitting unit configured to transmit to the terminal device an acknowledgement of receipt of the beam failure report.

In an embodiment, the at least one BFR option can be configured in the acknowledgement.

In an embodiment, the acknowledgement can indicate one or more of: an index or Cell/Carrier Indicator Flag (CIF) of the SCell, an index of a candidate beam recommended for BFR, an indicator of one of the BFR options; a PUCCH resource when the BFR with PUCCH is configured, or a PRACH resource when the BFR with CFRA is configured, and an index of a serving cell in which the terminal device is to perform the BFR, and/or when a Supplementary Uplink (SUL) carrier is configured for that serving cell, an indication of whether the SUL carrier is to be used for the BFR.

In an embodiment, the configuring unit 320 can be further configured to configure the terminal device with a PUCCH resource pool via Radio Resource Control (RRC) signaling. The acknowledgement can indicate a PUCCH resource in the PUCCH resource pool.

In an embodiment, the acknowledgement can be transmitted in a Medium Access Control (MAC) Control Element (CE).

In an embodiment, the acknowledgement can be transmitted in one single MAC CE along with another acknowledgement of receipt of another beam failure report associated with another SCell.

In an embodiment, the acknowledgement can be transmitted via RRC signaling.

In an embodiment, the acknowledgement can be transmitted as a MAC CE that is identified by a MAC Protocol Data Unit (PDU) sub-header with a predefined Logic Channel Identifier (LCID) and has a null payload.

In an embodiment, the at least one BFR option can be configured via RRC signaling.

In an embodiment, the acknowledgement can be transmitted in a Primary Cell (PCell), a PUCCH SCell, or an SCell with a configured downlink.

In an embodiment, the configuring unit 320 can be further configured to configure the terminal device with a BFR priority for each serving cell based on at least one of: a carrier frequency of that serving cell, a numerology or transmission duration of that serving cell, a service or logical channel associated with or mapped to that serving cell, a traffic load in that serving cell and whether the serving cell is a PUCCH SCell.

The receiving unit 310 and the configuring unit 320 can be configured to can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 4:
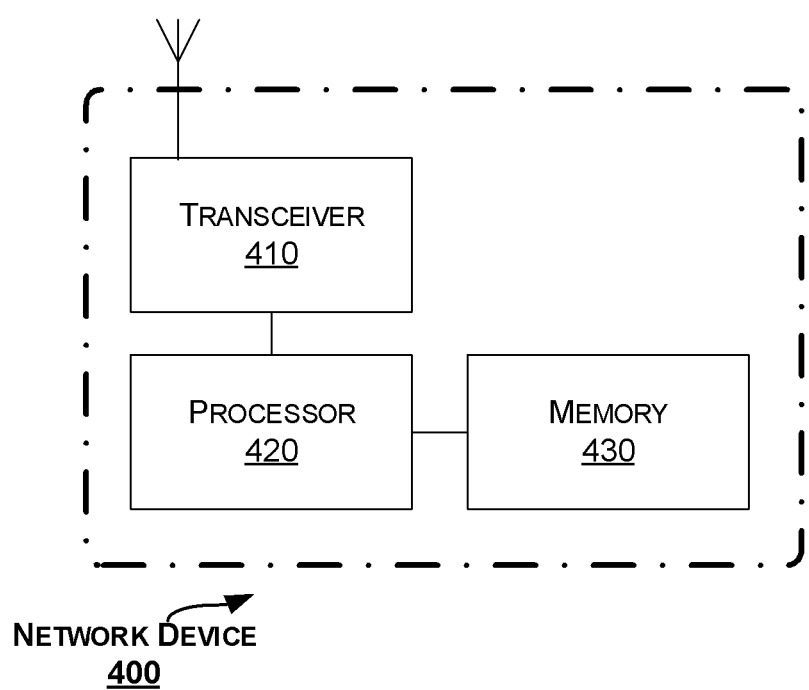
FIG. 4 is a block diagram of a network device according to another embodiment of the present disclosure.

FIG. 4 is a block diagram of a network device 400 according to another embodiment of the present disclosure.

The network device 400 includes a transceiver 410, a processor 420 and a memory 430. The memory 430 contains instructions executable by the processor 420 whereby the network device 400 is operative to perform the actions, e.g., of the procedure described earlier in conjunction with FIG. 1. Particularly, the memory 430 contains instructions executable by the processor 420 whereby the network device 400 is operative to: receive from a terminal device a beam failure report associated with an SCell; and configure the terminal device with at least one of the following BFR options: BFR with Physical Uplink Control Channel (PUCCH), BFR with Contention Free Random Access (CFRA), BFR with Contention Based Random Access (CBRA), and BFR without Physical Random Access Channel (PRACH) and PUCCH.

In an embodiment, the memory 430 can further contain instructions executable by the processor 420 whereby the network device 400 is operative to transmit to the terminal device an acknowledgement of receipt of the beam failure report.

In an embodiment, the at least one BFR option can be configured in the acknowledgement.

In an embodiment, the acknowledgement can indicate one or more of: an index or Cell/Carrier Indicator Flag (CIF) of the SCell, an index of a candidate beam recommended for BFR, an indicator of one of the BFR options; a PUCCH resource when the BFR with PUCCH is configured, or a PRACH resource when the BFR with CFRA is configured, and an index of a serving cell in which the terminal device is to perform the BFR, and/or when a Supplementary Uplink (SUL) carrier is configured for that serving cell, an indication of whether the SUL carrier is to be used for the BFR.

In an embodiment, the memory 430 can further contain instructions executable by the processor 420 whereby the network device 400 is operative to configure the terminal device with a PUCCH resource pool via Radio Resource Control (RRC) signaling. The acknowledgement can indicate a PUCCH resource in the PUCCH resource pool.

In an embodiment, the acknowledgement can be transmitted in a Medium Access Control (MAC) Control Element (CE).

In an embodiment, the acknowledgement can be transmitted in one single MAC CE along with another acknowledgement of receipt of another beam failure report associated with another SCell.

In an embodiment, the acknowledgement can be transmitted via RRC signaling.

In an embodiment, the acknowledgement can be transmitted as a MAC CE that is identified by a MAC Protocol Data Unit (PDU) sub-header with a predefined Logic Channel Identifier (LCID) and has a null payload.

In an embodiment, the at least one BFR option can be configured via RRC signaling.

In an embodiment, the acknowledgement can be transmitted in a Primary Cell (PCell), a PUCCH SCell, or an SCell with a configured downlink.

In an embodiment, the memory 430 can further contain instructions executable by the processor 420 whereby the network device 400 is operative to configure the terminal device with a BFR priority for each serving cell based on at least one of: a carrier frequency of that serving cell, a numerology or transmission duration of that serving cell, a service or logical channel associated with or mapped to that serving cell, a traffic load in that serving cell and whether the serving cell is a PUCCH SCell.

Figure 5:
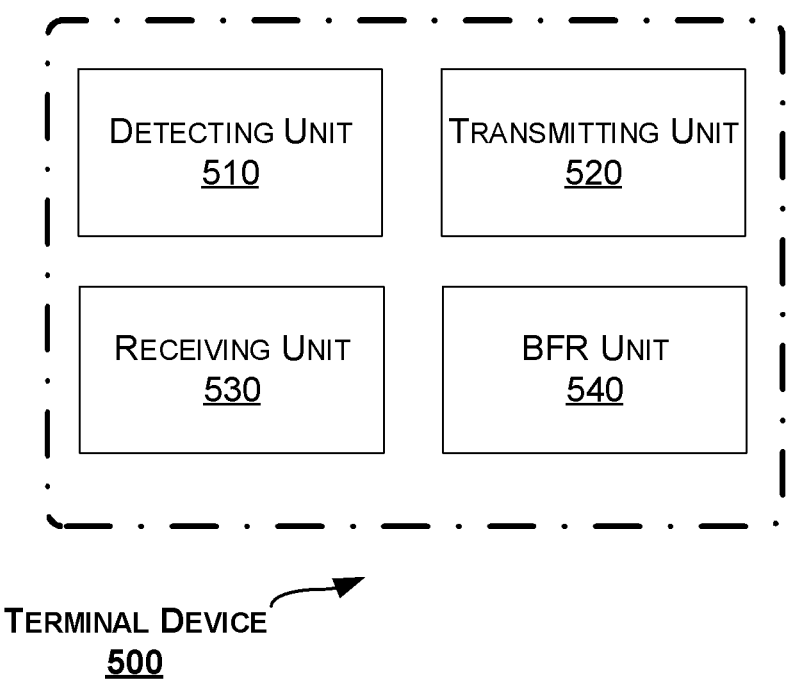
FIG. 5 is a block diagram of a terminal device according to an embodiment of the present disclosure.

Correspondingly to the method 200 as described above, a terminal device is provided. FIG. 5 is a block diagram of a terminal device 500 according to an embodiment of the present disclosure.

As shown in FIG. 5, the terminal device 500 includes a detecting unit 510 configured to detect a beam failure associated with a Secondary Cell (SCell). The terminal device 500 further includes a transmitting unit 520 configured to transmit to a network device a beam failure report associated with the beam failure. The terminal device 500 further includes a receiving unit 530 configured to receive a configuration of at least one of the following BFR options: BFR with Physical Uplink Control Channel (PUCCH), BFR with Contention Free Random Access (CFRA), BFR with Contention Based Random Access (CBRA), and BFR without Physical Random Access Channel (PRACH) and PUCCH. The terminal device 500 further includes a BFR unit 540 configured to perform a BFR in accordance with the at least one BFR option.

In an embodiment, the receiving unit 530 can further be configured to receive from the network device an acknowledgement of receipt of the beam failure report.

In an embodiment, the configuration of the at least one BFR option can be received in the acknowledgement.

In an embodiment, the acknowledgement can indicate one or more of: an index or Cell/Carrier Indicator Flag (CIF) of the SCell, an index of a candidate beam recommended for BFR, an indicator of one of the BFR options; a PUCCH resource when the BFR with PUCCH is configured, or a PRACH resource when the BFR with CFRA is configured, and an index of a serving cell in which the terminal device is to perform the BFR, and/or when a Supplementary Uplink (SUL) carrier is configured for that serving cell, an indication of whether the SUL carrier is to be used for the BFR.

In an embodiment, the receiving unit 530 can further be configured to receive from the network device a configuration of a PUCCH resource pool via Radio Resource Control (RRC) signaling. The acknowledgement can indicate a PUCCH resource in the PUCCH resource pool.

In an embodiment, the acknowledgement can be received in a Medium Access Control, (MAC) Control Element (CE).

In an embodiment, the acknowledgement can be received in one single MAC CE along with another acknowledgement of receipt of another beam failure report associated with another SCell.

In an embodiment, the acknowledgement can be received via RRC signaling.

In an embodiment, the acknowledgement can be received as a MAC CE that is identified by a MAC Protocol Data Unit (PDU) sub-header with a predefined Logic Channel Identifier (LCID) and has a null payload.

In an embodiment, the configuration of the at least one BFR option can be received via RRC signaling.

In an embodiment, the acknowledgement can be received in a Primary Cell (PCell), a PUCCH SCell, or an SCell with a configured downlink.

In an embodiment, when the BFR is performed in accordance with the BFR without PRACH and PUCCH, the BFR can be performed in the SCell. The BFR unit 540 can be further configured to: determine whether the BFR has succeeded based on a downlink or uplink data transmission in the SCell.

In an embodiment, the BFR unit 540 can be configured to determine whether the BFR has succeeded based on a downlink data transmission in the SCell by: receiving a downlink data over a Physical Downlink Shared Channel (PDSCH); transmitting a Hybrid Automatic Repeat reQuest (HARQ) Acknowledgement (ACK) or Non-Acknowledgement (NACK) over PUCCH in response to the downlink data; and determining, when an ACK is transmitted, that the BFR has succeeded when no further Physical Downlink Control Channel (PDCCH) is received for scheduling retransmission of the downlink data, or determining, when a NACK is transmitted, that the BFR has succeeded when Downlink Control Information (DCI) is received for scheduling retransmission of the downlink data with a redundancy version value different from an initial value or without New Data Indication (NDI) toggling.

In an embodiment, the BFR unit 540 can be configured to determine whether the BFR has succeeded based on an uplink data transmission in the SCell by: transmitting an uplink data over a Physical Uplink Shared Channel (PUSCH); and determining that the BFR has succeeded when no Downlink Control Information (DCI) is received for scheduling retransmission of the uplink data within a predetermined time period, or DCI is received for scheduling retransmission of the uplink data with a redundancy version value different from an initial value or without New Data Indication (NDI) toggling.

In an embodiment, the receiving unit 530 can further be configured to receive from the network device a configuration of a BFR priority for each serving cell dependent on at least one of: a carrier frequency of that serving cell, a numerology or transmission duration of that serving cell, a service or logical channel associated with or mapped to that serving cell, a traffic load in that serving cell and whether the serving cell is a PUCCH SCell.

In an embodiment, the transmitting unit 520 can further be configured to, prior to transmitting the beam failure report: transmit to the network device a PUCCH Scheduling Request (SR) for requesting an uplink grant for transmission of the beam failure report.

In an embodiment, the transmitting unit 520 can further be configured to start a timer associated with the acknowledgement when the beam failure report is transmitted; and retransmit the beam failure report upon expiry of the timer.

The detecting unit 510, the transmitting unit 520, the receiving unit 530 and the BFR unit 540 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 6:
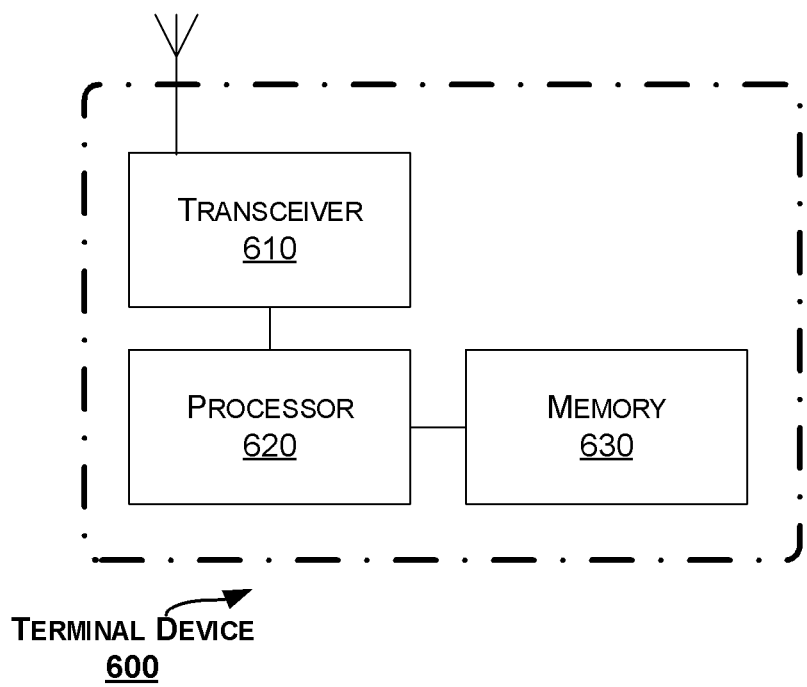
FIG. 6 is a block diagram of a terminal device according to another embodiment of the present disclosure.

FIG. 6 is a block diagram of a terminal device 600 according to another embodiment of the present disclosure.

The terminal device 600 includes a transceiver 610, a processor 620 and a memory 630. The memory 630 contains instructions executable by the processor 620 whereby the terminal device 600 is operative to perform the actions, e.g., of the procedure described earlier in conjunction with FIG. 2. Particularly, the memory 630 contains instructions executable by the processor 620 whereby the terminal device 600 is operative to: detect a beam failure associated with a Secondary Cell (SCell); and transmit to a network device a beam failure report associated with the beam failure. The memory 630 further contains instructions executable by the processor 620 whereby the terminal device 600 is operative to: receive a configuration of at least one of the following BFR options: BFR with Physical Uplink Control Channel (PUCCH), BFR with Contention Free Random Access (CFRA), BFR with Contention Based Random Access (CBRA), and BFR without Physical Random Access Channel (PRACH) and PUCCH; and perform a BFR in accordance with the at least one BFR option.

In an embodiment, the memory 630 can further contain instructions executable by the processor 620 whereby the terminal device 600 is operative to: receive from the network device an acknowledgement of receipt of the beam failure report.

In an embodiment, the configuration of the at least one BFR option can be received in the acknowledgement.

In an embodiment, the acknowledgement can indicate one or more of: an index or Cell/Carrier Indicator Flag (CIF) of the SCell, an index of a candidate beam recommended for BFR, an indicator of one of the BFR options; a PUCCH resource when the BFR with PUCCH is configured, or a PRACH resource when the BFR with CFRA is configured, and an index of a serving cell in which the terminal device is to perform the BFR, and/or when a Supplementary Uplink (SUL) carrier is configured for that serving cell, an indication of whether the SUL carrier is to be used for the BFR.

In an embodiment, the memory 630 can further contain instructions executable by the processor 620 whereby the terminal device 600 is operative to receive from the network device a configuration of a PUCCH resource pool via Radio Resource Control (RRC) signaling. The acknowledgement can indicate a PUCCH resource in the PUCCH resource pool.

In an embodiment, the acknowledgement can be received in a Medium Access Control, (MAC) Control Element (CE).

In an embodiment, the acknowledgement can be received in one single MAC CE along with another acknowledgement of receipt of another beam failure report associated with another SCell.

In an embodiment, the acknowledgement can be received via RRC signaling.

In an embodiment, the acknowledgement can be received as a MAC CE that is identified by a MAC Protocol Data Unit (PDU) sub-header with a predefined Logic Channel Identifier (LCID) and has a null payload.

In an embodiment, the configuration of the at least one BFR option can be received via RRC signaling.

In an embodiment, the acknowledgement can be received in a Primary Cell (PCell), a PUCCH SCell, or an SCell with a configured downlink.

In an embodiment, when the BFR is performed in accordance with the BFR without PRACH and PUCCH, the BFR can be performed in the SCell. The memory 630 can further contain instructions executable by the processor 620 whereby the terminal device 600 is operative to determine whether the BFR has succeeded based on a downlink or uplink data transmission in the SCell.

In an embodiment, the operation of determining whether the BFR has succeeded based on a downlink data transmission in the SCell can include: receiving a downlink data over a Physical Downlink Shared Channel (PDSCH); transmitting a Hybrid Automatic Repeat reQuest (HARQ) Acknowledgement (ACK) or Non-Acknowledgement (NACK) over PUCCH in response to the downlink data; and determining, when an ACK is transmitted, that the BFR has succeeded when no further Physical Downlink Control Channel (PDCCH) is received for scheduling retransmission of the downlink data, or determining, when a NACK is transmitted, that the BFR has succeeded when Downlink Control Information (DCI) is received for scheduling retransmission of the downlink data with a redundancy version value different from an initial value or without New Data Indication (NDI) toggling.

In an embodiment, the operation of determining whether the BFR has succeeded based on an uplink data transmission in the SCell can include: transmitting an uplink data over a Physical Uplink Shared Channel (PUSCH); and determining that the BFR has succeeded when no Downlink Control Information (DCI) is received for scheduling retransmission of the uplink data within a predetermined time period, or DCI is received for scheduling retransmission of the uplink data with a redundancy version value different from an initial value or without New Data Indication (NDI) toggling.

In an embodiment, the memory 630 can further contain instructions executable by the processor 620 whereby the terminal device 600 is operative to receive from the network device a configuration of a BFR priority for each serving cell dependent on at least one of: a carrier frequency of that serving cell, a numerology or transmission duration of that serving cell, a service or logical channel associated with or mapped to that serving cell, a traffic load in that serving cell and whether the serving cell is a PUCCH SCell.

In an embodiment, the memory 630 can further contain instructions executable by the processor 620 whereby the terminal device 600 is operative to, prior to transmitting the beam failure report: transmit to the network device a PUCCH Scheduling Request (SR) for requesting an uplink grant for transmission of the beam failure report.

In an embodiment, the memory 630 can further contain instructions executable by the processor 620 whereby the terminal device 600 is operative to start a timer associated with the acknowledgement when the beam failure report is transmitted; and retransmit the beam failure report upon expiry of the timer.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 420 causes the network device 400 to perform the actions, e.g., of the procedure described earlier in conjunction with FIG. 1; or code/computer readable instructions, which when executed by the processor 620 causes the terminal device 600 to perform the actions, e.g., of the procedure described earlier in conjunction with FIG. 2.

The computer program product may be configured as a computer program code structured in computer program modules. The computer program modules could essentially perform the actions of the flow illustrated in FIG. 1 or 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 7:
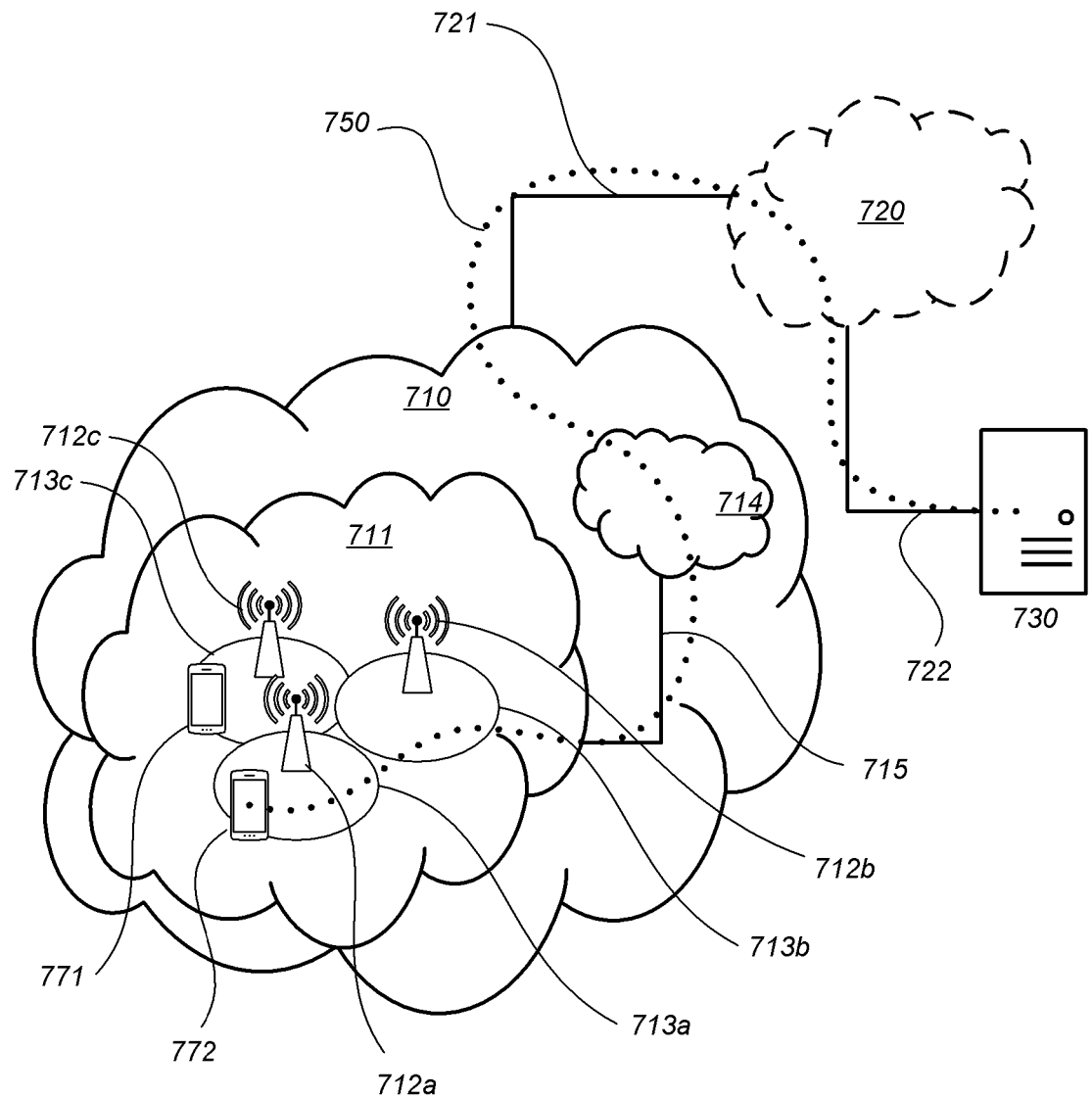
FIG. 7 schematically illustrates a telecommunication network connected via an intermediate network to a host computer.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first user equipment (UE) 771 located in coverage area 713c is configured to wirelessly connect to, or be paged by, the corresponding base station 712c. A second UE 772 in coverage area 713a is wirelessly connectable to the corresponding base station 712a. While a plurality of UEs 771, 772 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 771, 772 and the host computer 730. The connectivity may be described as an over-the-top (OTT) connection 750. The host computer 730 and the connected UEs 771, 772 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 771. Similarly, the base station 712 need not be aware of the future routing of an outgoing uplink communication originating from the UE 771 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
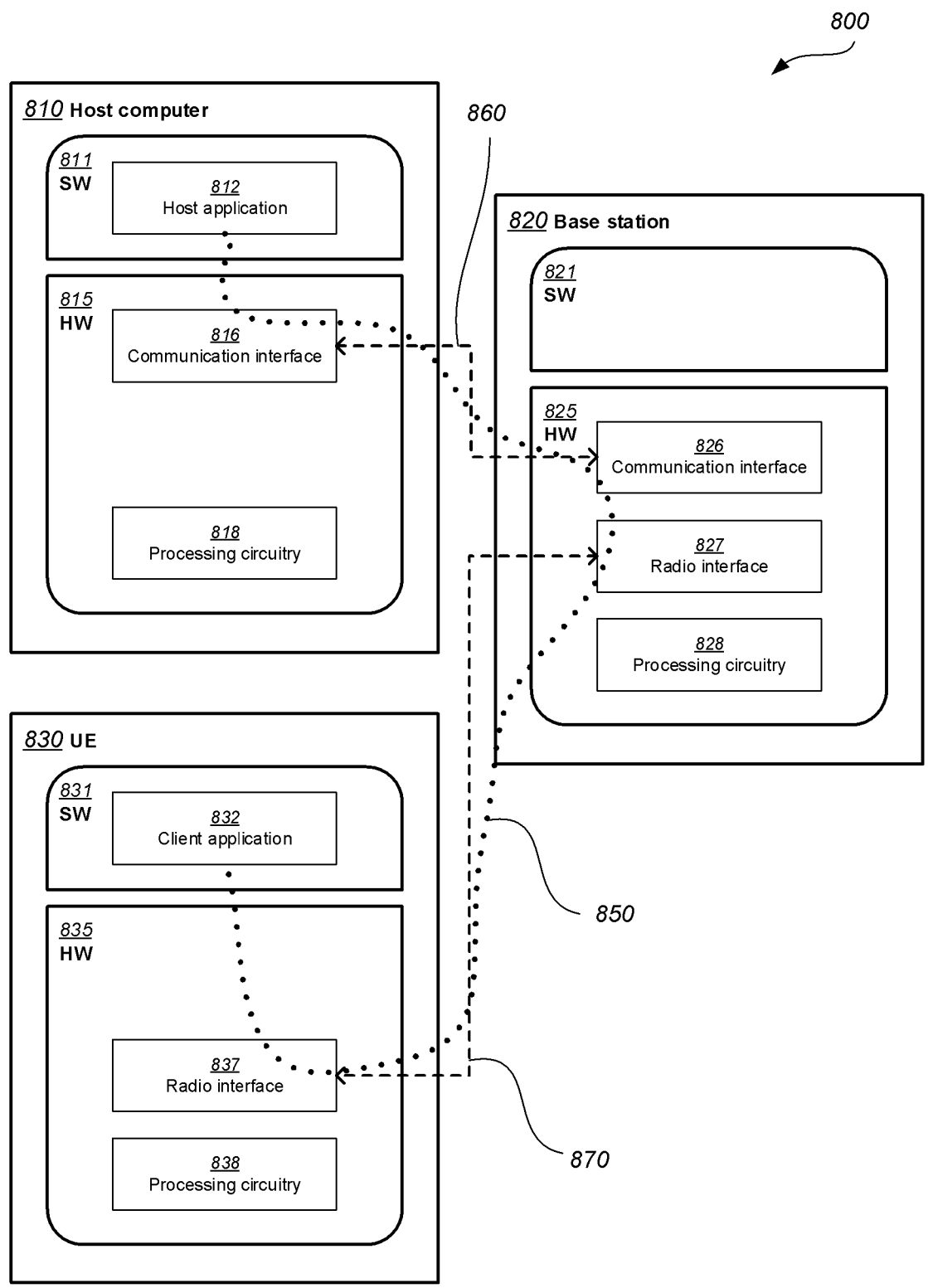
FIG. 8 is a generalized block diagram of a host computer communicating via a base station with a user equipment over a partially wireless connection.

It is noted that the host computer 810, base station 820 and UE 830 illustrated in FIG. 8 may be identical to the host computer 730, one of the base stations 712a, 712b, 712c and one of the UEs 771, 772 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve PRACH resource utilization and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for configuration of Beam Failure Recovery (BFR), comprising:
   receiving from a terminal device a beam failure report associated with a Secondary Cell (SCell); and
   after receiving the beam failure report transmitted by the terminal device, transmitting to the terminal device a message comprising at least a first BFR option indicator indicating one of the following BFR options:
   BFR with Physical Uplink Control Channel (PUCCH);
   BFR with Contention Free Random Access (CFRA);
   BFR with Contention Based Random Access (CBRA); or
   BFR without Physical Random Access Channel (PRACH) and PUCCH, wherein
   the message comprising the first BFR option indicator further comprises information identifying a PRACH resource, and
   the method further comprise receiving a message transmitted by the terminal device using the identified PRACH resource.

2. The method of claim 1, wherein
   the message comprising the first BFR option indicator is an acknowledgement of receipt of the beam failure report.

3. The method of claim 2, wherein the acknowledgement indicates one or more of:
   an index or Cell/Carrier Indicator Flag (CIF) of the SCell,
   a PUCCH resource when the BFR with PUCCH is configured, or a PRACH resource when the BFR with CFRA is configured, or
   an index of a serving cell in which the terminal device is to perform the BFR, and/or when a Supplementary Uplink (SUL) carrier is configured for that serving cell, an indication of whether the SUL carrier is to be used for the BFR.

4. The method of claim 2, wherein the acknowledgement is transmitted in a Primary Cell (PCell), a PUCCH SCell, or an SCell with a configured downlink.

5. The method of claim 2, wherein the acknowledgement indicates an index of a candidate beam recommended for BFR.

6. The method of claim 1, wherein
   the method further comprises configuring the terminal device with a PUCCH resource pool,
   the PUCCH resource pool comprising at least a first PUCCH resource,
   the first BFR option indicator indicates the BFR option of BFR with PUCCH, and
   the message comprising the first BFR option indicator further comprises information indicating the first PUCCH resource.

7. The method of claim 1, further comprising:
   configuring the terminal device with a BFR priority for each serving cell based on at least one of: a carrier frequency of that serving cell, a numerology or transmission duration of that serving cell, a service or logical channel associated with or mapped to that serving cell, a traffic load in that serving cell and whether the serving cell is a PUCCH SCell.

8. A method performed by a terminal device for Beam Failure Recovery (BFR), comprising:
   detecting a beam failure associated with a Secondary Cell (SCell);
   transmitting to a network device a beam failure report associated with the beam failure;
   after transmitting to a network device a beam failure report associated with the beam failure, receiving from the network device a message comprising at least a first BFR option indicator indicating one of the following BFR options:
      BFR with Physical Uplink Control Channel (PUCCH);
      BFR with Contention Free Random Access (CFRA);
      BFR with Contention Based Random Access (CBRA); or
      BFR without Physical Random Access Channel (PRACH) and PUCCH; and
   performing a BFR procedure in accordance with the first BFR option indicator, wherein
   the message comprising the first BFR option indicator further comprises information identifying a PRACH resource, and
   performing the BFR procedure in accordance with the first BFR option indicator comprises performing a random access procedure using the identified PRACH resource.

9. The method of claim 8, wherein
   the message comprising the first BFR option indicator is an acknowledgement of receipt of the beam failure report.

10. The method of claim 9, wherein the acknowledgement indicates one or more of:
   an index or Cell/Carrier Indicator Flag (CIF) of the SCell,
   an index of a candidate beam recommended for BFR,
   an indicator of one of the BFR options,
   a PUCCH resource when the BFR with PUCCH is configured, or a PRACH resource when the BFR with CFRA is configured or
   an index of a serving cell in which the terminal device is to perform the BFR, and/or when a Supplementary Uplink (SUL) carrier is configured for that serving cell, an indication of whether the SUL carrier is to be used for the BFR.

11. The method of claim 9, wherein the acknowledgement is received in a Medium Access Control (MAC) Control Element (CE).

12. The method of claim 11, wherein the acknowledgement is received in one single MAC CE along with another acknowledgement of receipt of another beam failure report associated with another SCell.

13. The method of claim 9, further comprising:
   starting a timer associated with the acknowledgement when the beam failure report is transmitted; and
   retransmitting the beam failure report upon expiry of the timer.

14. The method of claim 8, wherein
   the method further comprises receiving a radio resource control communication identifying a PUCCH resource pool comprising at least a first PUCCH resource,
   the first BFR option indicator indicates the BFR option of BFR with PUCCH, and the message comprising the first BFR option indicator further comprises information indicating the first PUCCH resource.

15. The method of claim 8, wherein, when the BFR is performed in accordance with the BFR without PRACH and PUCCH, the BFR is performed in the SCell and the method further comprises:
   determining whether the BFR has succeeded based on a downlink or uplink data transmission in the SCell.

16. The method of claim 15, wherein said determining whether the BFR has succeeded based on a downlink data transmission in the SCell comprises:
   receiving a downlink data over a Physical Downlink Shared Channel (PDSCH);
   transmitting a Hybrid Automatic Repeat Request (HARD) Acknowledgement (ACK), or Non-Acknowledgement (NACK), over PUCCH in response to the downlink data; and
   determining, when an ACK is transmitted, that the BFR has succeeded when no further Physical Downlink Control Channel (PDCCH) is received for scheduling retransmission of the downlink data, or determining, when a NACK is transmitted, that the BFR has succeeded when Downlink Control Information (DCI) is received for scheduling retransmission of the downlink data with a redundancy version value different from an initial value or without New Data Indication (NDI) toggling.

17. The method of claim 15, wherein said determining whether the BFR has succeeded based on an uplink data transmission in the SCell comprises:
   transmitting an uplink data over a Physical Uplink Shared Channel (PUSCH; and
   determining that the BFR has succeeded when no Downlink Control Information (DCI) is received for scheduling retransmission of the uplink data within a predetermined time period, or DCI is received for scheduling retransmission of the uplink data with a redundancy version value different from an initial value or without New Data Indication (NDI) toggling.

18. The method of claim 8, further comprising:
   receiving from the network device a configuration of a BFR priority for each serving cell dependent on at least one of: a carrier frequency of that serving cell, a numerology or transmission duration of that serving cell, a service or logical channel associated with or mapped to that serving cell, a traffic load in that serving cell and whether the serving cell is a PUCCH SCell.

19. The method of claim 8, further comprising, prior to said transmitting the beam failure report:
   transmitting to the network device a PUCCH Scheduling Request for requesting an uplink grant for transmission of the beam failure report.

20. A terminal device comprising a transceiver, a processor and a memory, the memory comprising instructions executable by the processor whereby the terminal device is configured to:
   detect a beam failure associated with a Secondary Cell (SCell);
   transmit to a network device a beam failure report associated with the beam failure;
   after transmitting to a network device a beam failure report associated with the beam failure, receive from the network device a message comprising at least a first beam failure recovery (BFR) option indicator indicating one of the following BFR options:

BFR with Physical Uplink Control Channel (PUCCH);
BFR with Contention Free Random Access (CFRA);
BFR with Contention Based Random Access (CBRA); or
BFR without Physical Random Access Channel (PRACH) and PUCCH; and performing a BFR procedure in accordance with the first BFR option indicator, wherein the message comprising the first BFR option indicator further comprises information identifying a PRACH resource, and performing the BFR procedure in accordance with the first BFR option indicator comprises performing a random access procedure using the identified PRACH resource.

\* \* \* \* \*